Patented July 26, 1949

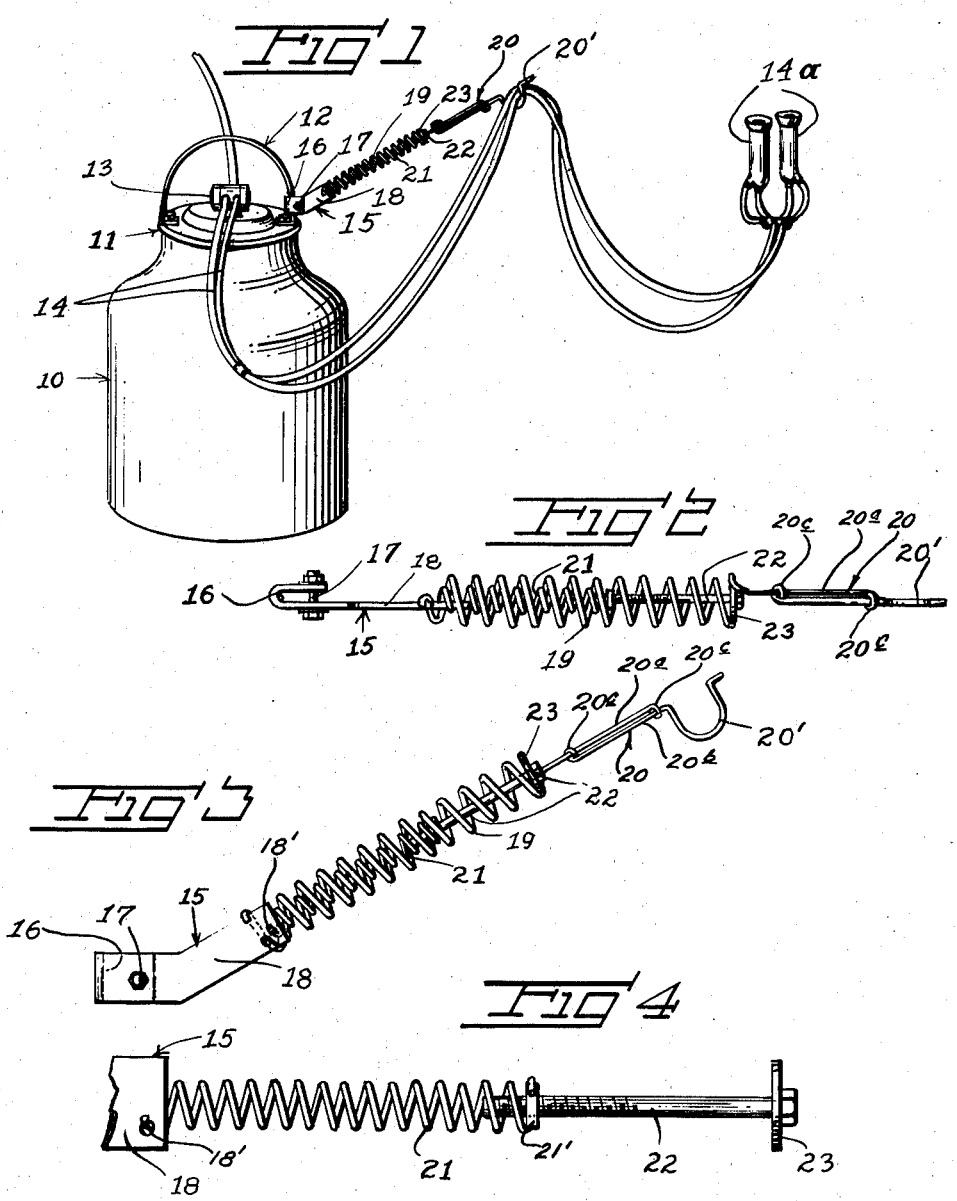

2,477,366

UNITED STATES PATENT OFFICE 2,477,366

MILKER TUBE HOLDER

Harlan J. Easton, Blooming Prairie, Minn.

Application August 30, 1946, Serial No. 694,029

2 Claims. (Cl. 248—51)

The object of this invention is to hold up the milker tubes leading from the cow's udder to the milker head of the machine in order to prevent the tubes from touching the floor.

If the tubes drag on the floor as the cow moves about, she is apt to step on them or push them into manure and the teat cups may even be detached and become dirty so that the milk would be contaminated and spoiled.

In order to overcome such calamity the tube supporter of this invention is attached to the milker head or its handle to carry the weight of the tubes during the milking procedure high enough above the ground so that no part of the tubes can be soiled.

One embodiment of the supporter is illustrated in the attached drawing wherein like numerals refer to the same details in the different views.

Figure 1 is a perspective view of a milker jar and head to which the supporter for two milker tubes is attached;

Figure 2 is a top plan view of a flexible supporter arm;

Figure 3 is a side view of Figure 2; and

Figure 4 is an enlarged view in plan of a tension adjustment device for the supporting spring.

The milker, which may be of any suitable kind, is here shown as consisting of a jar 10 with a milker head or lid 11 fitting the top of the jar and provided with a lifting handle 12. The milker head 11 has the usual fixtures 13 for receiving the ends of the milker tubes 14, two here shown for each cow, provided with the usual teat cups 14a at their free ends for connection with the cow's udder.

The supporter proper 15, of which there generally are two, consists of a bracket 16 with clamp screws 17, and is fastened as low as possible on the lid handle 12 to be near to the tube fixture 13. On its upwardly directed shank 18 is secured the inner end of a relatively long coiled spring 19, which is fairly stiff in order to be able to carry the weight of two milker tubes 14.

The other or outer end of the spring 19 carries a relatively long arm which is generally designated 20 and which is formed in the two parts 20a and 20b which are coupled together by the end loops or eyes 20c whereby the length of the arm may be increased or decreased as desired.

While the arm portion 20a may be connected to the outer end of the spring 19 as desired, a preferred construction is as here illustrated where the end of the spring itself is extended into the straight portion 20a.

The free end of the arm portion 20b has a hook 20' large enough to conveniently hold the two milker tubes 14. Within the main spring 19 is housed another coiled spring 21 of smaller diameter for reinforcing as well as adjusting the carrying power of the tension spring 19. One end of the spring 21 is secured to the bracket portion 18 as indicated at 18' and the other end of the spring 21 has secured therein a nut 21' through which is threaded an adjusting bolt 22 carrying a washer 23 which fits over the larger spring. The inner spring 21 is materially shorter than the enclosing outer spring 19 and accordingly the bolt 22 extends through a part of the outer spring to the washer 23 which is engaged against the outer end of the larger spring as stated. Accordingly it will be readily seen that by turning the bolt 22 so that it will be threaded into or out of the smaller inner spring, the tension of the springs, particularly the outer spring 19 will be increased or decreased thereby increasing or decreasing the stiffness or resiliency of the entire supporting structure.

This adjustment for the device enables the farmer to regulate the supporter to suit conditions on his farm as some tubes are heavier, and other tubes longer than the usual kind.

It is to be understood that the invention as herein disclosed may be varied from the details described and shown without departure from the spirit of the subjoined claims.

I claim:

1. A supporting arm of the character stated, comprising a bracket adapted to be secured to a support, a relatively long coil spring secured at one end to the bracket to extend outwardly therefrom, a relatively long arm extending longitudinally from the other end of the spring, means carried by the arm for supporting a body, a second coil spring secured at one end to the bracket and lying within the first spring, a bolt threaded at one end into the other end of the second spring for longitudinal adjustment therein, and a coupling between the other end of the bolt and the said other end of the first spring by which the tension of the springs may be altered by turning the bolt.

2. A supporting arm of the character stated comprising a bracket adapted to be secured to a support, a relatively long coil spring secured at one end to the bracket to extend outwardly therefrom, said spring at its other end being continued in a straight relatively long arm, an article supporting means carried by said relatively long arm, a second coil spring disposed within the first spring and secured at one end to the bracket, the second spring being of materially less length than the first spring, a nut secured in the outer end of the second spring, a threaded bolt threadably engaged in the nut and extending outwardly through the outer spring, the bolt having a head upon its outer end, and a washer through which the bolt passes, the washer being disposed against the outer end of the outer spring, the bolt when rotated in the nut functioning to alter the tension of the springs.

HARLAN J. EASTON.

REFERENCES CITED

The following references are of record in the file of this patent:

UNITED STATES PATENTS

| Number | Name | Date |
|---|---|---|
| 1,476,395 | Davis | Nov. 4, 1922 |
| 1,513,258 | Manz | Oct. 28, 1924 |
| 1,519,341 | Smith | Dec. 16, 1924 |
| 2,248,447 | Wood | July 8, 1941 |
| 2,328,718 | Haykin | Sept. 7, 1943 |
| 2,397,094 | Donkersley et al. | June 9, 1944 |